March 17, 1970  J. C. WRIGHT  3,500,693
REVERSIBLE ROLLER TOP CONVEYOR DRIVE
Filed Oct. 11, 1968  4 Sheets-Sheet 1

INVENTOR.
James C. Wright
BY
ATTORNEYS

March 17, 1970  J. C. WRIGHT  3,500,693
REVERSIBLE ROLLER TOP CONVEYOR DRIVE
Filed Oct. 11, 1968  4 Sheets-Sheet 3

INVENTOR.
James C. Wright
BY
ATTORNEYS

March 17, 1970 J. C. WRIGHT 3,500,693
REVERSIBLE ROLLER TOP CONVEYOR DRIVE

Filed Oct. 11, 1968 4 Sheets-Sheet 4

INVENTOR.
James C. Wright
BY
ATTORNEYS

United States Patent Office 3,500,693
Patented Mar. 17, 1970

1

3,500,693
REVERSIBLE ROLLER TOP CONVEYOR DRIVE
James C. Wright, Aurora, Colo., assignor to Cutler-Hammer, Inc., Milwaukee, Wis., a corporation of Delaware
Filed Oct. 11, 1968, Ser. No. 766,876
Int. Cl. F16h 9/00, 11/00
U.S. Cl. 74—220                                    10 Claims

ABSTRACT OF THE DISCLOSURE

This invention relates to a reversible roller top conveyor drive wherein a motor having spaced parallel output shafts on opposite ends thereof turning in different directions is connected in driving relation to the main drive pulleys of the roller top by a pair of belt-and-pulley type power transfer mechanisms. The motor is mounted for rockable movement about a transverse axis located between the output shafts in parallel relation thereto so that, when it is tilted to and fro, it will alternately connect one power transfer mechanism while allowing the other to slip and thus disengage.

---

In my U.S. Patent No. 3,134,476, I disclose one form of reversible roller top conveyor wherein the only way that the direction of roller rotation could be changed was to reverse the direction of the electric motor drive connected thereto. In certain applications where the direction of flow at an intersection is subjected to only occasional changes, the use of a reversible electric motor as the drive for the rollers is, by far, the simplest and least expensive solution. It is not, however, well-suited to systems requiring frequent changes in the direction of flow.

A better solution for the latter system is that shown in our U.S. Patent No. 3,232,409 where two parallel sets of belts running in opposite directions are disposed beneath the rollers of the roller top. One set of belts is movable from an inactive position beneath the other set to a superimposed one supporting and driving the rollers. As such, both sets of belts can be kept running in the same direction at all times and even derive their power from the same source.

Even so, the above, described system has certain deficiencies, not the least of which is its complexity and inherent expense. Secondly, the level or height at which the roller top operates is slightly different for each direction which can cause some problems in matching it up with other conveyor units in the same system that may operate at a fixed height. Finally, the unit will not change direction instantaneously, but requires a little time to raise and lower the rollers.

The instant invention, on the other hand, accomplishes the change in direction substantially instantaneously and more simply than the latter of the above-described patented systems while more reliably than the former. The main drive shaft on the rotor of the motor is double-ended and both ends are connected through appropriate reduction gearing to a pair of parallel output shafts that turn in opposite directions. The motor housing is mounted for rockable movement about a transverse axis intermediate the two output shafts so that either end may be lowered and rendered operative to drive the roller conveyor while the other end is raised into disengaged position. As an end of the motor is lowered into operative position by actuating a pneumatic servo-motor connected to the motor housing, it tightens a belt to complete a driving connection to the roller top while, at the same time, releasing the belt on the raised end allowing it to slip. Since the motor runs continuously and always in the same direction, changes in the direction of movement of the roller top can be made instantaneously and with a minimum of stress on the motor and related parts of the drive train. The inclusion of belts in the drive train rather than some other type of direct mechanical hookup insures that slippage or breakage of a drive belt will likely occur before anything else can happen in the event of a maulfunction.

It is, therefore, the principal object of the present invention to provide a novel and improved reversing mechanism for roller top conveyors.

A second object of the invention is to provide a unit of the type aforementioned which is capable of sustaining repeated instantaneous reversals over prolonged periods of time without appreciable wear or damage to the components.

Another object of the invention herein disclosed and claimed is to provide a roller conveyor reversing mechanism wherein the drive motor runs continuously in the same direction.

Still another object is the provision of a reversing mechanism that incorporates a pair of power transfer mechanisms alternatively actuated by a pneumatic servomotor connected to rock the main electric motor to and fro.

An additional object of the invention forming the subject matter hereof is to provide a reversing mechanism for conveyors and the like that uses belts as the drive links and idler pulleys to maintain one of said belts disengaged at all times.

A further object is to provide a reversible drive that is simple, inexpensive, rugged, trouble-free, versatile, compact, lightweight and easily serviced and maintained.

Other objects will be in part apparent and in part pointed out specifically hereinafter in connection with the description of the drawings that follows, and in which.

Figure 1:
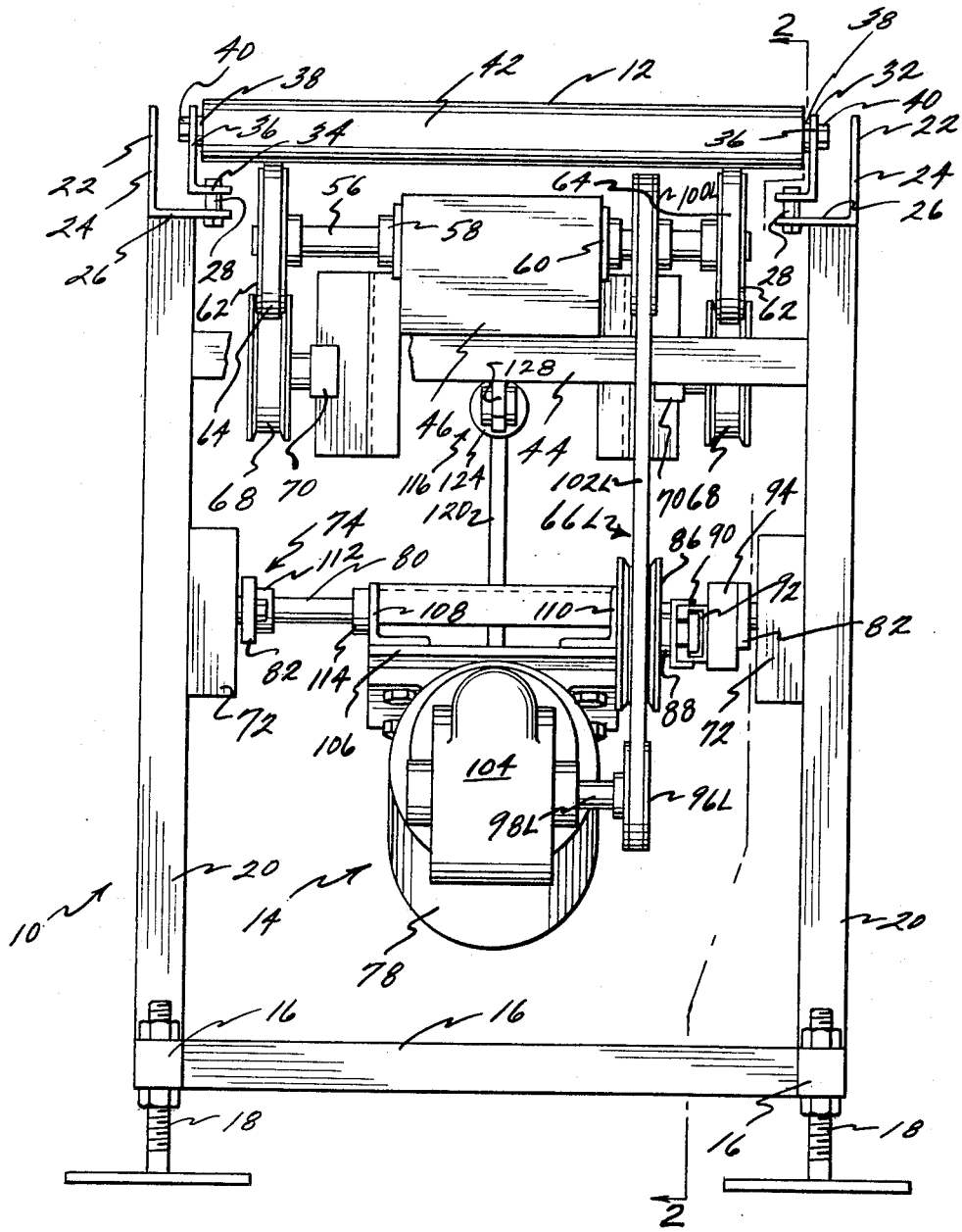
FIGURE 1 is an end elevation showing a roller top conveyor equipped with the reversing mechanism of the present invention, portions of the frame having been broken away to better reveal the interior construction.

Referring now to the drawings for a detailed description of the present invention, the unit will be seen to include a frame designated in a general way by numeral 10, atop which is mounted the roller top 12 capable of being driven in either direction by the reversible drive mechanism forming the subject matter hereof which has been broadly referred to by numeral 14. The frame 10 has a rectangular base 16 in the particular form shown with adjustable screw-type legs 18 at the corners. Uprights 20 located at the corners of the base support a pair of angle irons 22 in spaced parallel relation to one another as they extend horizontally from end to end along the front and rear edges of the top. The upstanding flanges 24 of these angle irons each lie outboard in remote relation to one another, while their horizontal flanges 26 project toward each other in essentially coplanar relation. A pair of upstanding guide pins 28 project above the surface of flanges 26 and fit loosely into corresponding holes in the roller frame 32 so as to keep the latter properly aligned while allowing it to move up and down freely or "float."

Figure 2:
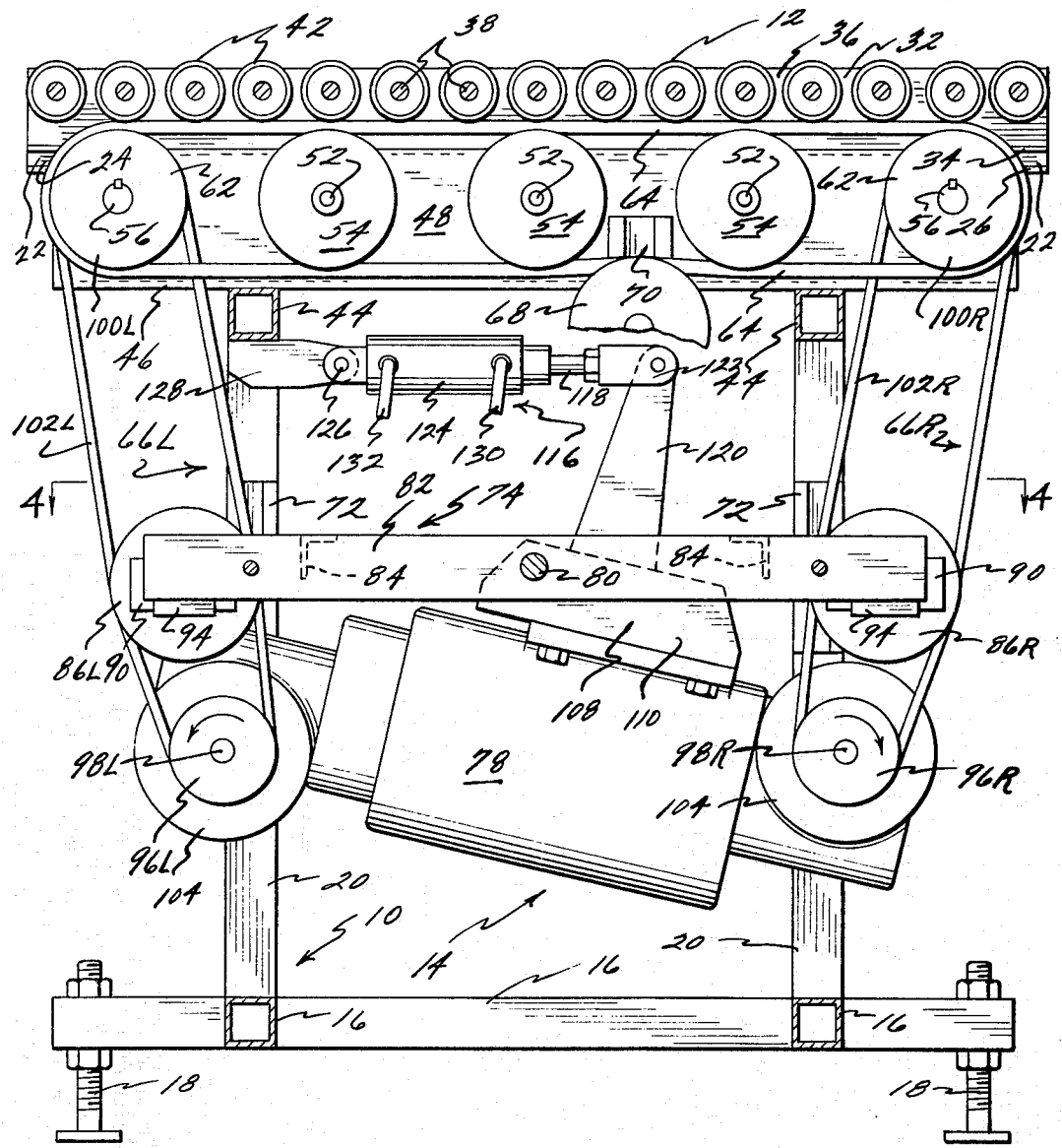
FIGURE 2 is a section taken along line 2—2 of FIGURE 1.
Figure 3:
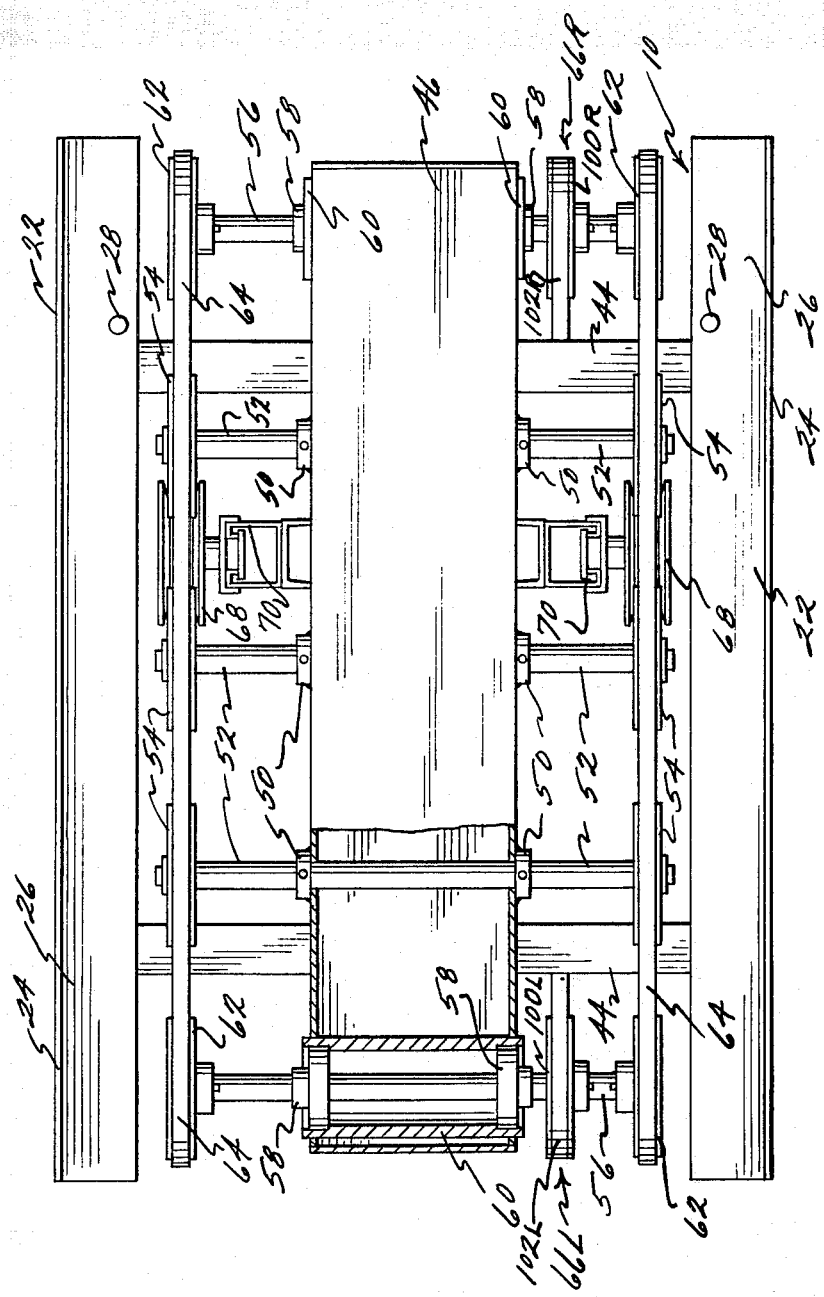
FIGURE 3 is a top plan view of the unit with the roller top removed and part of the housing that supports the pulley shafts broken away and shown in section to better expose the latter; and, FIGURE 4 is a horizontal section taken along line 4—4 of FIGURE 2.

The roller frame 32 comprises little more than a second similarly disposed pair of angle irons of slightly smaller size whose horizontal flanges 34 receive the guide pins while the vertical flanges 36 receive the ends of the roller shafts 38 which are secured thereto by nuts 40. Rollers 42 are, of course, journaled for rotation on the roller shafts in closely-spaced parallel relation as shown in FIGURE 2.

A pair of laterally-extending horizontal cross pieces 44 are connected between the front and rear pairs of uprights 20 spaced beneath the roller frame. Resting atop these cross pieces is an elongate box-like housing 46 extending longitudinally underneath the roller frame approximately midway between the front and rear edges thereof. The vertical sidewalls 48 of this housing mount a plurality of transversely aligned sets of shaft collars 50 that nonrotatably receive a corresponding number of axles 52 that are arranged in longitudinally-spaced parallel relation to one another and which have their ends projecting both onto the front and rear of housing 46. Journaled for rotation on the opposite ends of each axle 52 are V-belt pulleys 54 arranged in longitudinal alignment with one another. In the particular form shown, three such sets of pulleys are shown carried by housing 46 intermediate its ends.

A pair of shafts 56 are journaled for rotation at opposite extremities of housing 46 within shaft bearings 58 which, in turn, are mounted in opposite extremities of a tubular bearing holder 60. Each of these shafts carries a pair of V-belt pulleys 62 fastened on opposite ends for rotational movement therewith in longitudinally-aligned relation to one another and to the corresponding set of pulleys 54 in the same side. Endless V-belts 64 reaved around the front and rear sets of longitudinally-aligned pulleys mentioned above form a driving support for the rollers of the roller table as shown in FIGURES 1 and 2. With the entire weight of the roller table resting atop the V-belts and the surfaces of the individual rollers in frictional contact with both belts, it becomes a simple matter to drive the table by rotating either of the shafts 56. The belt-and-pulley power transfer mechanisms that form a part of the reversing mechanism 14 have been broadly designated by numeral 66 and will be described in detail presently.

It is quite important that the belts 64 be kept reasonably tight in order that they maintain continuous contact with each roller; therefore, a vertically-adjustable belt-tightening pulley 68 is located underneath the roller top in position to engage the return run of these V-belts and take out any slack that is present therein. A vertically-slotted track subassembly 70 carried on opposite sides of housing 46 mounts pulleys 68 for vertical adjustment.

Figure 4:
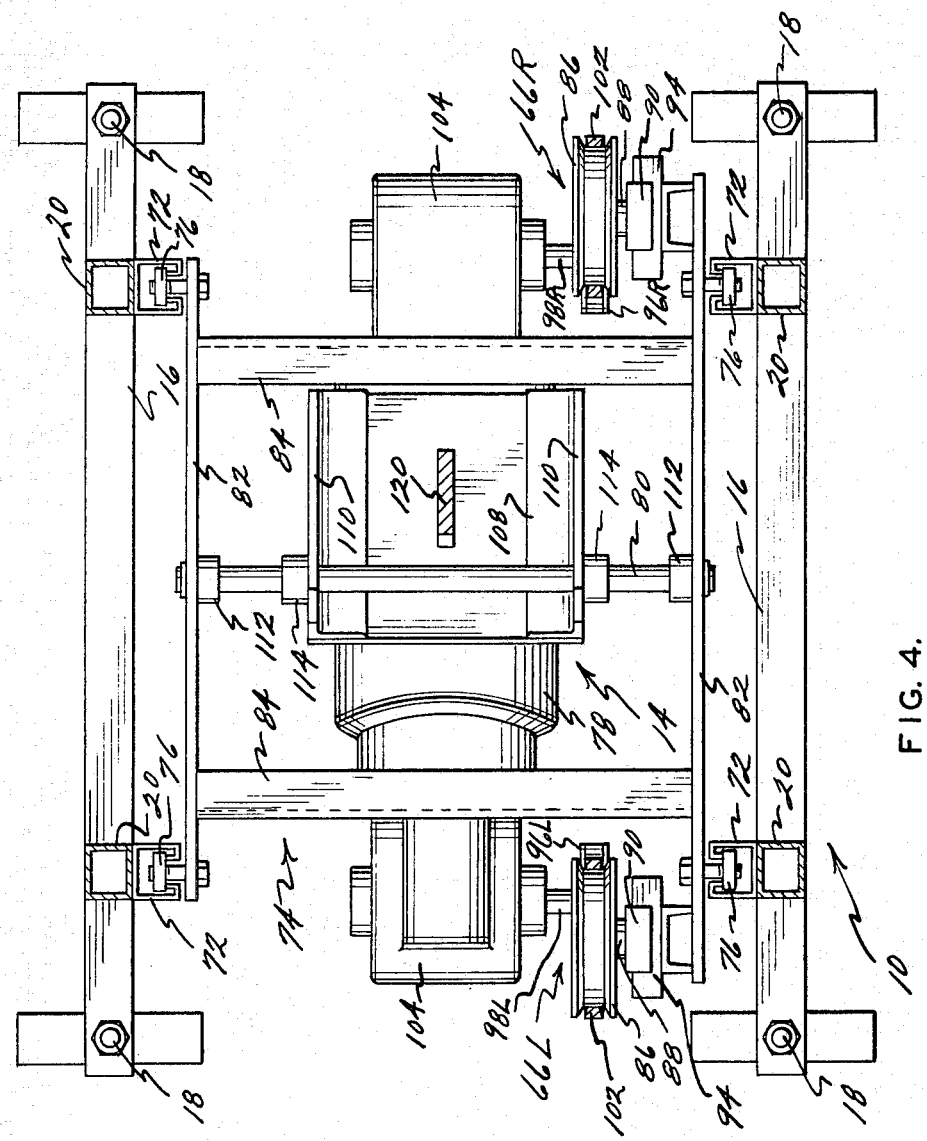

Similar sections of slotted track 72 are fastened to the inside of each upright 20 opening toward one another in the manner most clearly revealed in FIGURE 4. A vertically-adjustable subframe that has been indicated in a general way by reference numeral 74 carries slide blocks 76 at each corner that are adjustably fastened at the desired height within the slotted track sections 72 that are found necessary to maintain the proper belt tension in power transfer mechanisms 66. The motor 78 is suspended from this subframe for rockable movement about a transverse shaft 80 so as to tilt to and fro in response to actuation of a servo-motor which will be explained presently. This subframe 74 includes a pair of transversely-spaced longitudinal elements 82 carrying the slide blocks 76 on opposite ends thereof facing outwardly toward the front and rear, and a pair of longitudinally-spaced transverse elements 84 interconnecting the longitudinal elements but spaced well inwardly of the ends thereof as shown most clearly in FIGURES 2 and 4.

One of the two longitudinal elements 82 mounts a pair of belt-spreading idler pulleys 86 on the inside of its overhanging end portions. These pulleys are identical and they comprise a very important part of the reversing mechanism 14 as they function to disengage the power transfer mechanism 66 associated therewith as will be seen shortly. Each pulley has its axle 88 fastened to a slide block 90 which is mounted in track 92 of the pulley-mounting subassembly 94 for limited horizontal adjustment. In the particular arrangement shown, pulleys 86 are mounted on the rear of the front longitudinal subframe member 82 in direct vertical alignment with the drive pulleys 96 on the output shafts 98 of the motor 78. The driven pulleys 100 mounted on shafts 56 inboard of the adjacent V-belt pulley 62 cooperate with V-belts 102, drive pulleys 96 and the belt-spreading idler pulleys 86 to form the power transfer mechanisms 66.

Motor 78 is a commercially-available gear motor wherein the rotor shaft (not shown) is double-ended and operatively connected to a pair of parallel counter-rotating output shafts 98 through appropriate right-angle reduction gearing that is also hidden inside gear housings 104. Thus, whenever motor 78 is energized, its rotor is turning the same direction while its geared-down output shafts 98 are turning in opposite directions as indicated by the arrows in FIGURE 2. When the lefthand power transfer mechanism 66L, as viewed in FIGURE 2, is operative to interconnect motor 78 and the roller top in driving relation, the goods conveyed on the latter will move from right to left. Conversely, establishment of a driving connection through the righthand power transfer mechanism 66R will move articles from left to right on the roller top.

Motor 78 is suspended from the underside of a rockable motor mount that includes a flat bedplate 106 having short sections of angle iron 108 fastened to the front and rear edges thereof, the upturned flanges 110 of which receive the transversely extending shaft 80. This shaft is mounted for rotation in journals 112 fastened to the inside surfaces of longitudinal subframe elements 82, and shaft collars 114 fasten the shaft to the upturned flanges 110 of the motor mount for unison movement. In the preferred embodiment of the invention illustrated herein, the shaft 80 is located directly over the center of mass of the motor 78 so as to normally maintain the output shafts 98 in approximately the same horizontal plane with the system at rest or in the neutral position shown in FIGURE 2 and the belts 102 and servo-motor, indicated broadly by reference numeral 116, disconnected therefrom. Actually, the "neutral" position shown occupied by the elements of the reversing mechanism in the drawings is a transitory one which they occupy only momentarily as they shift back and forth between the two operative positions where one output shaft is lowered to form a driving connection with its power transfer mechanism and the other output shaft is raised up into disengaged position. In actual operation, servo-motor 116 always remains actuated into one of its operative positions where its piston rod 118 is either fully extended or fully retracted rather than halfway in between as shown in FIGURE 2. The required shift into one of these two operative positions is accomplished by actuating pneumatic servo-motor 116 which will now be described.

A rigid crank arm 120 projects upwardly from the bedplate 106 of the motor mount and is pivotally connected to the clevis 122 on the end of the piston rod 118 of the servo-motor. The cylinder 124 is similarly connected for pivotal movement about a transversely-extending pivot pin 126 carried by mounting bracket 128 fastened to one of the uprights 20 of the frame. A pair of airlines 130 and 132 connect into opposite ends of the cylinder and function alternatively as feed and exhaust lines shifting the piston (not shown) to and fro therein. Initially, we will assume that the unit is to be placed in operation so that the roller top discharges goods conveyed thereon off to the left in FIGURE 2. For this to occur, power transfer mechanism 66L must remain connected to the roller top in driving relation thereto while its counterpart 66R is disengaged and rendered inoperative. Accordingly, servo-motor 116 is actuated so as to retract the piston rod 118 all the way back into the cylinder by introducing air under pressure in ahead of the piston through conduit 130 while exhausting same through conduit 132. As the piston rod retracts, the motor will pivot about the axis defined by shaft 80, thus lowering the lefthand output shaft 98L and completing the driving connection to the roller top through lefthand power transfer mechanism 66L. Simultaneously, the righthand end of the motor, along with its output shaft 98R, is being elevated, thus introducing slack into the righthand V-belt 102R and disengaging power transfer mechanism 66R. Pulley 96R on the elevated end of the motor will move considerably closer to its corresponding belt-spreading idler pulley 86R and, since the diameter of the belt-groove in the idler pulley is much greater than the analogous groove in pulley 96R, the slack belt 102R will be spread apart quite close to the latter pulley and held essentially out of contact therewith, at least to the extent of breaking any driving connection therebetween. Obviously, when the motor 78 is started up, both shafts 98R and 98L will turn, but only the latter will complete the driving connection to the roller top through pulley 96L, belt 102L and driven pulley 100L. Now, when the occasion demands a change in the direction of flow of the goods across the roller top, the operator need only reverse the direction of flow of air to the servo-motor 116 causing the piston rod to fully extend. As this occurs, output shaft 98R will drop down to the level formerly occupied by shaft 98L, thus establishing a driving connection to the roller top through pulley 96R, belt 102R and driven pulley 100R, but from left to right instead of right to left. Note, that the direction the motor is turning has not changed even though the direction of roller top movement has reversed almost instantaneously. When the piston rod of the servo-motor extends fully from the neutral position shown in FIGURE 2, the lefthand end of the motor 78 will raise up about shaft 80 as a pivot and release belt 102L from operative engagement with pulley 96R. The subframe 74, once adjusted to the proper height, remains at the same level, and more 78 merely tilts to and fro to establish a driving connection at one end while breaking the driving connection at the other.

Finally, while the reversing mechanism of the present invention has been illustrated and described as a means used to accomplish substantially instantaneous reversal of a roller conveyor, it should be apparent that the mechanism could easily be adapted to performance of the reversing function in many other different types of reversible mechanical subassemblies without calling upon the exercise of inventive faculties.

What is claimed is:

1. In an apparatus having a mechanical subassembly adapted to be driven in opposite directions, the improved reversible drive means therefor which comprises: drive means mounted for rockable movement in substantially fixed spaced relation to the mechanical subassembly about an axis extending transversely of its directions of movements, said drive means having a pair of output shafts being driven thereby in opposite directions located on opposite sides of its axis of rockable movement; a power transfer means connecting each of the output shafts to the mechanical subassembly for alternate independent actuation of the latter in opposite directions, each of said power transfer means including a driven pulley connected to the mechanical subassembly and operative upon rotation to drive same, a drive pulley mounted on the output shaft for rotational movement therewith and translatory movement relative to the driven pulley upon rockable movement of the drive means, and a belt reaved between said drive and driven pulleys, said belts being of a length adapted to alternately tighten and slacken as the drive means is rocked to and fro about its axis, the tight belt completing a driving connection between said drive means and mechanical subassembly while the slack belt disengages same one from the other; and, servo-motor means connected to the drive means operative upon actuation to shift the latter between its alternate driving positions.

2. The reversible drive means as set forth in claim 1 in which: the axes of rotation of the driven and drive pulleys of each power transfer mechanism remain in essentially spaced parallel relation to one another in all relative positions thereof.

3. The reversible drive means as set forth in claim 1 in which: the drive means is mounted for adjustment relative to the mechanical subassembly so as to vary the degree of tilt required of said drive means about its axis between the alternate driving positions thereof.

4. The reversible drive means as set forth in claim 1 in which: the servo-motor means is of the pneumatically-operated piston and cylinder type.

5. The reversible drive means as set forth in claim 1 in which: the output shafts are arranged in spaced substantially parallel relation to one another and to the axis of rockable movement of the drive means.

6. The reversible drive means as set forth in claim 5 in which: the axes of rotation of the output shafts lie approximately the same radial distance on opposite sides of the axis of rockable movement of the drive means.

7. The reversible drive means as set forth in claim 1 in which: belt-spreading means is located between the drive and driven pulleys of each power transfer mechanism in contact with the belt, said means being adapted upon translatory movement of the drive pulley toward the driven pulley to hold the slack belt open and prevent it from making sufficient frictional contact with said drive pulley to establish a driving connection therebetween.

8. The reversible drive means as set forth in claim 7 in which: the belt-spreading means comprises an idler pulley journaled for rotation about an axis located between the opposite rims of the belt.

9. The reversible drive means as set forth in claim 8 in which: the effective diameter of the idler pulley is greater than the effective diameter of the drive pulley of the associated power transfer means.

10. The reversible drive means as set forth in claim 8 in which: the axis of rotation of the idler pulley lies in spaced substantially parallel relation to the axis of rotation of the associated output shaft in all positions of the latter and said axis of idler pulley rotation is also adjustable relative to said output shaft axis so as to vary the maximum and minimum spacings therebetween.

References Cited

UNITED STATES PATENTS

| 2,583,272 | 1/1952 | Metzler | 74—220 |
| 2,903,077 | 9/1959 | Kamlukin | 74—220 XR |
| 3,187,674 | 6/1965 | Hammelmann | 74—242.15 XR |

FRED C. MATTERN, Jr., Primary Examiner

JAMES A. WONG, Assistant Examiner

U.S. Cl. X.R.

74—242.1, 242.15